May 12, 1970 F. E. JONES 3,511,172
TACOS SHELL COOKING UNIT
Filed Dec. 26, 1967 2 Sheets-Sheet 1
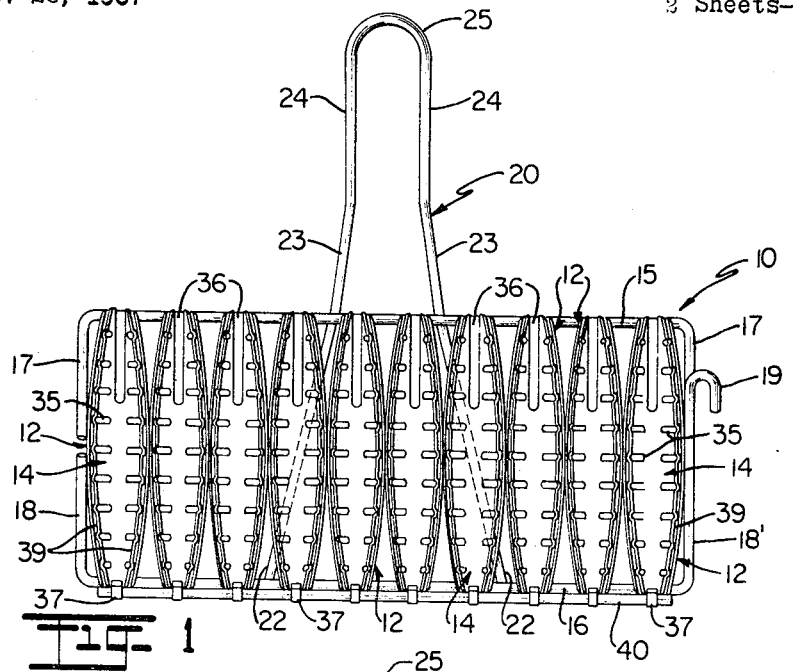
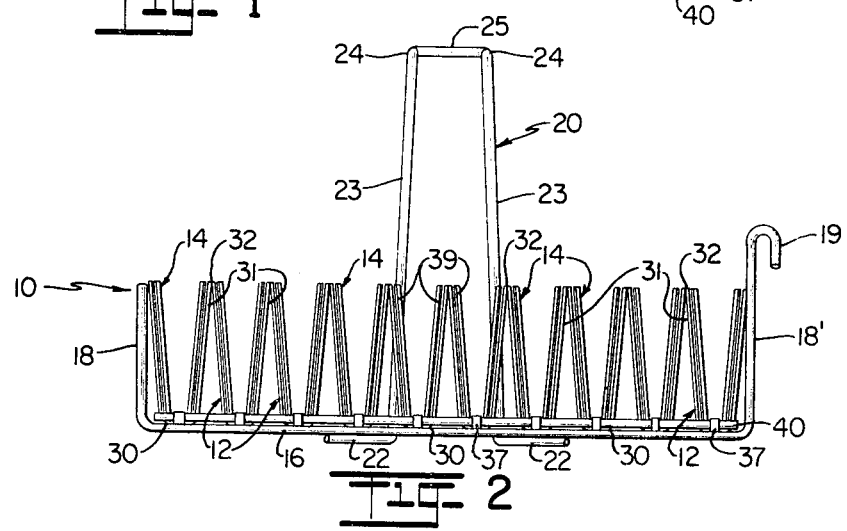
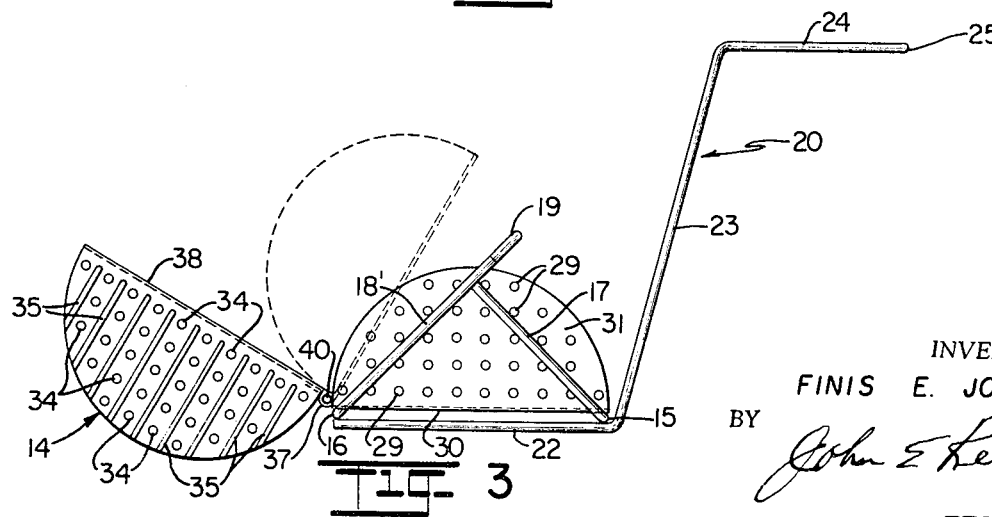
INVENTOR.
FINIS E. JONES
BY John E. Reilly
ATTORNEY May 12, 1970     F. E. JONES     3,511,172
TACOS SHELL COOKING UNIT
Filed Dec. 26, 1967     2 Sheets-Sheet 2
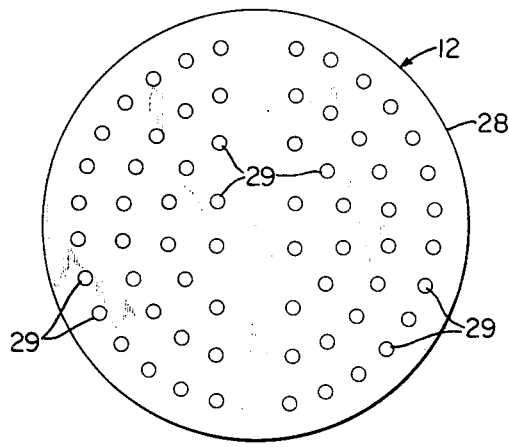
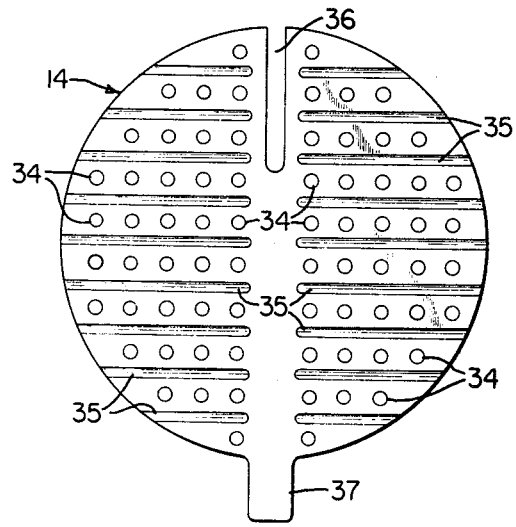
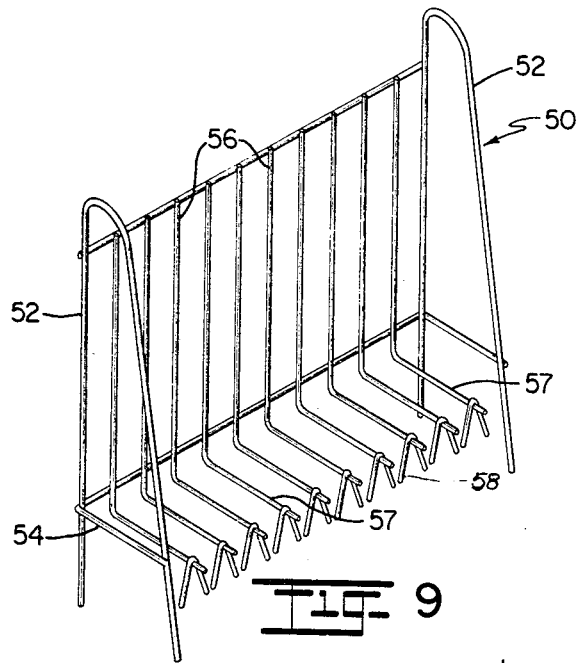
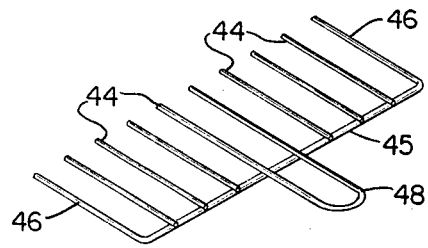
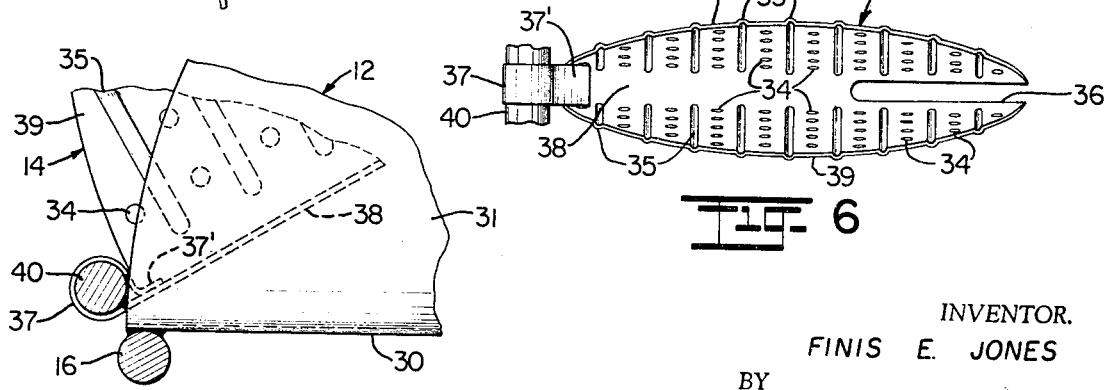
INVENTOR.
FINIS E. JONES
BY
ATTORNEY

United States Patent Office 3,511,172
Patented May 12, 1970

3,511,172
TACOS SHELL COOKING UNIT
Finis E. Jones, 2630 Yates, Denver, Colo. 80212
Filed Dec. 26, 1967, Ser. No. 693,313
Int. Cl. A23p 1/00
U.S. Cl. 99—426
9 Claims

ABSTRACT OF THE DISCLOSURE

A cooking unit for tacos shells has a frame comprised of U-shaped stationary molds each adapted to receive a shell-supporting mold hinged to the frame alongside the lower closed end of each stationary mold. A tacos shell is placed over the external surface of each shell-supporting mold as it is advanced into nested relation with its stationary mold, and a fork is provided for simultaneous removal of the cooked tacos shells from the shell support members to deposit the shells in stacked relation on a rack.

---

This invention relates to cooking utensils and more particularly relates to a novel and improved unit for cooking and stacking tacos shells in a rapid, dependable manner.

The tacos shell is an edible shell formed by folding a relatively flat circular cake of cornmeal or dough, referred to as a tortilla, into generally U-shaped configuration and cooking to the desired crispness in a deep fat fryer. The cooked shell is then loosely stuffed with various ingredients, such as, chopped lettuce, spices and meats, according to different recipes. Prior to cooking, the circular cake is relatively soft and pliable and must therefore be firmly supported when immersed and cooked in the fryer. Various utensils have been proposed in the past to serve as formers or molds for retaining one or more tortillas in the desired shape during the cooking process, and in most cases the domestic and commercial cooking units presently in use follow the principle of interposing the tortilla between a pair of generally U-shaped molds or formers arranged in nested relation to one another. While such units have been generally satisfactory from the standpoint of maintaining the desired shape of the shell during cooking and at the same time permitting adequate drainage and uniform heating of the shell, handling of the shells and formers both in loading the uncooked shells and in unloading the cooked shells is very time-consuming and tedious, especially in large scale operations. It is therefore an object of the present invention to overcome the foregoing and other difficulties and drawbacks in tacos shell cooking units in providing for a novel and improved cooking unit which is highly simplified and easy to use in the loading, cooking and removal of one or more tacos shells.

It is another object of the present invention to provide for cooking tacos shells in such a way as to facilitate insertion and removal of one or more shells into and from the cooking unit in an effective and dependable manner, and specifically wherein the shells may be quickly loaded in series for even, uniform cooking with proper drainage followed by rapid, simultaneous removal and stacking without direct handling of the shells in a minimum number of steps.

It is a further object of the present invention to provide a tacos shell cooking unit conformable for use in domestic or commercial cooking applications which is lightweight, compact, can be produced economically of relatively low cost materials and is safe and easy to handle.

It is a still further object of the present invention to provide in a cooking unit for a series of tacos shell molds or formers so constructed and arranged as to facilitate loading and unloading of the tacos shells before and after cooking, respectively, in further combination with a multi-tined fork cooperating with the molds to facilitate simultaneous removal of the shells therefrom and a rack which enables simultaneous stacking of a series of cooked tacos shell for storage preliminary to use.

In accordance with the present invention, the preferred form of tacos shell cooking unit consists of an open frame provided with a series of generally U-shaped molds or formers arranged in upwardly facing, side-by-side relation above the frame. A corresponding number of U-shaped shell-supporting molds are hinged along one side of the frame opposite each of the stationary molds for independent swinging movement into a nested position within each mold with each shell sandwiched between the hinged and stationary molds. In the relationship described, each shell can be applied to the external surface of a shell-supporting mold as the latter is rotated into nested relation so as to permit placement and loading of the shell between the molds in one movement. When the desired number of shells are loaded the unit may be immersed in a deep fat fryer and the shells cooked for the desired time interval then removed and drained.

In order to facilitate simultaneous removal of the cooked shells from between the molds, a fork is provided with a series of tines corresponding in number and spacing to the molds so that each tine may be inserted through a slotted portion of each shell-supporting mold to lift the shells off the molds for placement on a supporting rack, the rack also being provided with a series of tines corresponding in number and spacing to those of the fork and of the molds.

The above and other objects, advantages and features of the present invention will become more readily appreciated and understood from a consideration of the following detailed description of a preferred form of the present invention when taken together with the accompanying drawings, in which:

FIG. 1 is a top plan view of a preferred form of tacos shell cooking unit in accordance with the present invention.

FIG. 2 is a side elevational view of the preferred form of cooking unit.

FIG. 3 is an end view of the preferred form of cooking unit.

FIG. 4 is an enlarged view of a flat circular plate to be folded into generally U-shaped configuration in forming a stationary mold.

FIG. 5 is an enlarged view of a flat circular plate to be formed into a generally U-shaped hinged mold.

FIG. 6 is an enlarged view of a folded hinged mold member.

FIG. 7 is a fragmentary view illustrating the relationship between a pair of cooperating hinged and stationary mold portions.

FIG. 8 is a perspective view of a multi-tined fork member forming part of the cooking unit; and FIG. 9 is a perspective view of a tacos shell-supporting rack forming a part of the cooking unit of the present invention.

Referring in detail to the drawings, a preferred form of shell-supporting assembly is illustrated in FIGS. 1 to 3 which broadly comprises an open sided frame 10 provided with a series of outer stationary molds 12 arranged in side-by-side relation across the frame, and a corresponding number of hinged inner molds 14 movable into and away from nested relation to the stationary molds 12. In the preferred form, the frame 10 may be composed of wire or like material having longitudinal sides 15 and 16 extending in spaced parallel relation along the base of the frame and terminating at opposite ends in upwardly and inwardly inclined end portions 17 and 18, respectively. In addition, it will be noted that one end portion 18' terminates in an outwardly directed hook 19 at its upper extremity for suspension of the frame on the side of a deep fat fryer or other cooking vessel. A handle 20 is defined by a generally U-shaped bracket having horizontal divergent arm portions 22 extending transversely beneath the width of the frame 10, upwardly and rearwardly inclined arm portions 23 and an upper horizontally extending handle portion 24 terminating in a curved end 25. To rigidly assemble the frame and handle portion, the lower horizontally extending arm portions 22 are welded or otherwise permanently attached to the undersurfaces of opposite sides 15 and 16 of the frame with the spacing between the side members 15 and 16 corresponding to the length of the stationary molds 12.

As shown in FIG. 4, each stationary mold is formed from a thin circular plate or disk 28 which is provided with a series of drain openings 29 of limited size. Each plate is diametrically folded into generally U-shaped configuration so as to define the mold 12 which as seen from FIGS. 1 and 2 has a lower folded portion 30 with upwardly divergent sides 31 of generally semi-circular configuration. Opposite ends of the lower folded portion 30 rest upon the side members 15 and 16 of the frame and are welded thereto. In addition, the upper contacting side edges 32 of adjacent molds 12 are welded together and the upper edges 32 of the outside stationary molds are welded to the opposite end portions 17 and 18 of the frame to complete the rigid frame structure.

As shown in FIG. 5, each hinged mold 14 is correspondingly formed from a relatively thin circular plate having drain openings 34 of a limited size at spaced intervals throughout the plate. In addition, each plate is provided with external ribs or convolutions 35, an open radial slot 36 and a hinge strap 37 projecting from the peripheral edge of the plate diametrically opposite the slot 36. Each plate 14 is in a similar fashion diametrically folded into generally U-shaped configuration to define a folded portion 38 formed symmetrically about an axis through the open slot 36 and hinge strap 37 with opposite sides 39 diverging upwardly from the folded portion. In this relation, the convolutions 35 extend vertically along opposite sides of each of the hinged molds, or in other words, at right angles to the diametric line through the slot and hinge strap 37.

In order to mount a series of inner molds 14 in hinged relation of the stationary molds, an elongated rod 40 is positioned in adjacent but spaced parallel relation above one side 16 of the frame opposite the handle 20, the rod being welded to the ends of the stationary molds adjacent to their lower folded portions 30, as best seen from FIG. 7. Each mold 14 is secured in hinged relation on the rod by bending its hinged strap 37 upwardly and over the rod member with the free end 37' of each strap being transversely curved somewhat in the form of a trough to rest snugly against the lower folded surface portion of the hinged mold 14. If desired, the free end 37' may be permanently attached by welding to the folded portion of the mold while permitting the mold to freely rotate about the rod. Further it will be noted that each of the hinged mold members 14 is independently hinged about the rod for free swinging movement from a position away from the stationary mold in which the hinged mold is in outwardly disposed downwardly facing position into upwardly facing nested relation within a stationary mold. In this way, a tortilla or uncooked shell which for example may correspond to the size and shape of one of the mold plates 12, as shown in FIG. 4, may be applied to the external surface of each hinged mold as the latter is advanced upwardly and inwardly into nested relation within a stationary mold, and each hinged mold may be loaded in succession in corresponding manner with the tortilla or uncooked shell interposed in snug-fitting relation between the inner hinged mold and outer stationary mold.

In use, the loaded basket may be immersed in a deep fat fryer and supported by means of the hook 19 on a sidewall of the fryer. In cooking, the drain openings will permit the fat to circulate through the inner and outer mold sections to uniformly heat and cook the shells. After cooking, the handle portion may be grasped to lift the basket from the fryer and held in a raised position for a sufficient time interval to permit the fat to drain out of the frame. Upon removal from the fryer, the frame may be tipped about the hinged end of the molds to cause the hinged molds and cooked shells to be released from the stationary molds into the outwardly disposed inverted position.

In unloading or removing the cooked shells from the hinged molds, an important feature of the present invention resides in the formation of the open slots 36 at the free ends of the mold 14 in that the slots will permit insertion of a fork or like utensil beneath the shell in order to lift the shell away from the mold section. A preferred form of the fork is shown in FIG. 8 which consists of a series of spaced parallel tines 44 connected at one end to an elongated wire 45, opposite ends 46 of the wire being bent at right angles to define two additional tines at opposite ends of the fork. A curved handle portion 48 is also secured to the wire support 45 and extends rearwardly in the plane of the tines. The tines correspond in number and spacing to the number and spacing of hinged mold sections of the frame in order that the cooked shells may be simultaneously removed from the hinged molds simply by insertion of the tines upwardly through the slots 36 to engage the inner surfaces of the shells for release from the mold sections.

As shown in FIG. 9, a rack 50 is provided for stacking of the cooked shells, the rack being in the form of a wire frame having opposite sides 52 with spaced parallel, vertically extending wires 53 interconnected by generally U-shaped wires 54 at spaced vertical intervals. The front of the rack is open and the back of the rack has vertically extending wires 56, each wire terminating at its lower end in a horizontally extending tine 57 having an inverted V-shaped guide wire 58 at its leading end. The spacing and number of tines 57 corresponds to the spacing and number of tines 44 and 46 on the fork whereby the cooked shells may be deposited on the tines 57 merely by lining up the shells on the fork with the tines and tipping the fork to slide the shells onto the tines 57. Although not shown it will be appreciated that each load of cooked shells as it is removed by the fork from the hinged mold sections may be stacked or nested upon the preceding row of shells on the rack.

It will be apparent from the foregoing that the preferred form of cooking unit of the present invention greatly facilitates loading and simultaneous removal of the tacos shells in a minimum number of steps and with a minimum of handling required. The stated objectives are accomplished in particular through the use of mold sections hinged along the base or lower folded ends of the stationary molds and wherein each hinged mold section has a slotted free end portion to enable quick release of the shells. In this relation the convolutions formed along the external surface of the hinged molds reduce any tendency of the uncooked shell to be squeezed into the drain openings and to otherwise become lodged or stuck against the mold sections during the cooking operation and thus cooperate with the slotted portions for easy, rapid unloading of the cooked shells. Of course any desired number of mold sections may be employed in combination and suspended in any desired manner within the fryer, and for commercial operations the maximum number that can be efficiently handled by one person should be employed in combination. It will be further appreciated that both the inner and outer molds 12 and 14 may be hinged independently of one another on the frame. Moreover, it will be apparent that the supporting rod 40 for the hinged molds may be affixed to the stationary mold

What is claimed is:

1. In a tacos shell cooking unit,
an open supporting frame having a relatively flat open base and generally U-shaped outer molds arranged in upwardly facing, side-by-side relation to one another on said frame and each including a lower closed end affixed to said base,
correspondingly U-shaped inner shell-supporting molds being independently hinged in side-by-side relation to one another along one side of said frame for swinging movement from an inverted, downwardly facing position into upwardly facing, nested relation within each of said outer molds, and
said inner shell-supporting molds each having a lower closed end independently hinged outwardly of and above one side of said base for swinging movement between the inverted position for disposition of a tacos shell on the external surface of each shell-supporting mold and a nested position with each tacos shell interposed between each shell-supporting inner mold and an outer mold.

2. In a tacos shell cooking unit according to claim 1, each of said inner and outer molds being provided with drain openings of limited size, and each of said inner shell-supporting molds being further provided with convolutions along either side to facilitate removal of a tacos shell therefrom.

3. In a tacos shell cooking unit according to claim 1 each of said inner shell-supporting molds including a folded portion having a hinged member at one end and a radial slot at its opposite end.

4. In a tacos shell cooking unit according to claim 1, said relatively flat open base having upstanding end portions, a hook portion on one end of said frame for mounting on the side of a deep fat fryer and the like, and a handle portion extending upwardly and rearwardly from one side of said frame.

5. In a tacos shell cooking unit,
an open supporting frame having generally U-shaped outer molds arranged in upwardly facing, side-by-side relation to one another on said frame,
correspondingly, U-shaped, inner shell-supporting molds independently hinged in side-by-side relation to one another along one side of said frame for swinging movement between an inverted, downwardly facing position and an upwardly facing, nested position within each of said outer molds, the free end of each inner shell-supporting mold opposite the hinged end being provided with a slot open to the free end to facilitate removal of each tacos shell from said inner shell-supporting mold.

6. A tacos shell cooking unit comprising in combination:
a supporting frame having a series of stationary mold-receiving compartments arranged in upwardly facing, side-by-side relation to one another on said frame and each including a lower closed end affixed to said frame, and
a series of generally U-shaped molds, each independently hinged along one side of said frame outwardly of and above the lower end of said mold-receiving compartments, each of said U-shaped molds being aligned for swinging movement between an outward, inverted position for disposition of a tacos shell on the external surface thereof and a nested position within a mold-receiving compartment with each tacos shell interposed between each U-shaped mold and said outer mold-receiving compartment.

7. A tacos shell cooking unit according to claim 6, further including a hinge support at the lower ends of said mold-receiving compartment, each of said U-shaped molds being defined by a generally circular plate folded into a U-shaped member including a radial projection at one end adapted for hinged connection to said hinge support, and a slot extending radially from the end of the folded portion opposite the hinged end.

8. A tacos shell cooking unit according to claim 7, each U-shaped mold member being provided with external ribs extending vertically along the sides of said member and drain openings at spaced intervals in each of said U-shaped mold members.

9. A tacos shell cooking unit according to claim 7, each of said compartments being defined by a circular plate diametrically folded into generally U-shaped configuration and disposed in upwardly facing relation on said frame, and
said frame being defined by a pair of wires extending in horizontally spaced relation along opposite lower ends of said compartments and terminating in upwardly and inwardly inclined end portions.

References Cited

UNITED STATES PATENTS

| | | | |
|---|---|---|---|
| 992,417 | 5/1911 | Gale | 99—379 |
| 1,148,129 | 7/1915 | Taylor | 99—449 |
| 2,652,766 | 9/1953 | Cralle | 99—402 XR |
| 2,719,480 | 10/1955 | Prickett et al. | 99—426 |
| 2,805,314 | 9/1957 | Michaelis | 99—403 XR |
| 2,847,933 | 8/1958 | Pate | 99—426 |
| 3,020,826 | 2/1962 | Silva | 99—426 |
| 3,217,633 | 11/1965 | Anetsberger | 99—403 |
| 3,308,748 | 3/1967 | Jalbert | 99—448 XR |

WALTER A. SCHEEL, Primary Examiner

A. O. HENDERSON, Assistant Examiner